United States Patent
Imazeki

(10) Patent No.: US 10,222,669 B2
(45) Date of Patent: Mar. 5, 2019

(54) DISPLAY DEVICE

(71) Applicant: Japan Display Inc., Tokyo (JP)

(72) Inventor: Yoshikatsu Imazeki, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/661,577

(22) Filed: Jul. 27, 2017

(65) Prior Publication Data

US 2018/0031939 A1    Feb. 1, 2018

(30) Foreign Application Priority Data

Jul. 29, 2016  (JP) ................. 2016-149577

(51) Int. Cl.
| | | |
|---|---|---|
| *G02F 1/1362* | (2006.01) | |
| *G02F 1/1333* | (2006.01) | |
| *G02F 1/1335* | (2006.01) | |
| *G02F 1/1339* | (2006.01) | |
| *G02F 1/1368* | (2006.01) | |

(52) U.S. Cl.
CPC ...... *G02F 1/136286* (2013.01); *G02F 1/1339* (2013.01); *G02F 1/13338* (2013.01); *G02F 1/133345* (2013.01); *G02F 1/133528* (2013.01); *G02F 1/136204* (2013.01); *G02F 1/1368* (2013.01); *G02F 1/133512* (2013.01); *G02F 2001/13629* (2013.01); *G02F 2001/133334* (2013.01); *G02F 2001/136295* (2013.01); *G02F 2201/42* (2013.01); *G02F 2201/501* (2013.01); *G02F 2202/22* (2013.01); *G02F 2202/28* (2013.01)

(58) Field of Classification Search
CPC ..... G02F 1/13338; G02F 1/161; G02F 1/0107
See application file for complete search history.

(56) References Cited

U.S. PATENT DOCUMENTS

2011/0316810 A1* 12/2011 Tsujino ............... G02F 1/13338
                                                                    345/174
2015/0241745 A1    8/2015 Tashiro

FOREIGN PATENT DOCUMENTS

| | | |
|---|---|---|
| CN | 104391389 | 3/2015 |
| CN | 105093629 | 11/2015 |
| JP | 2009008971 | 1/2009 |
| JP | 2009-237410 | 10/2009 |
| JP | 2015-161753 | 9/2015 |
| TW | 201314295 | 4/2013 |

OTHER PUBLICATIONS

Taiwan Office Action dated Mar. 29, 2018 in corresponding Taiwan Application No. 106125516.

* cited by examiner

*Primary Examiner* — Kendrick Hsu
(74) *Attorney, Agent, or Firm* — K&L Gates LLP

(57) ABSTRACT

According to one embodiment, a display device includes first and second substrates, a display function layer, a polarizer, and a connecting material. The first substrate includes a first conductive layer. The second substrate includes a basement having first and second surfaces. The display function layer is disposed between the substrates. The polarizer is disposed above the second surface and includes a second conductive layer. The connecting material electrically connects the first and second conductive layers. The basement has a first hole. The polarizer has a second hole. The connecting material contacts the first and second conductive layers via the first and second holes.

19 Claims, 9 Drawing Sheets

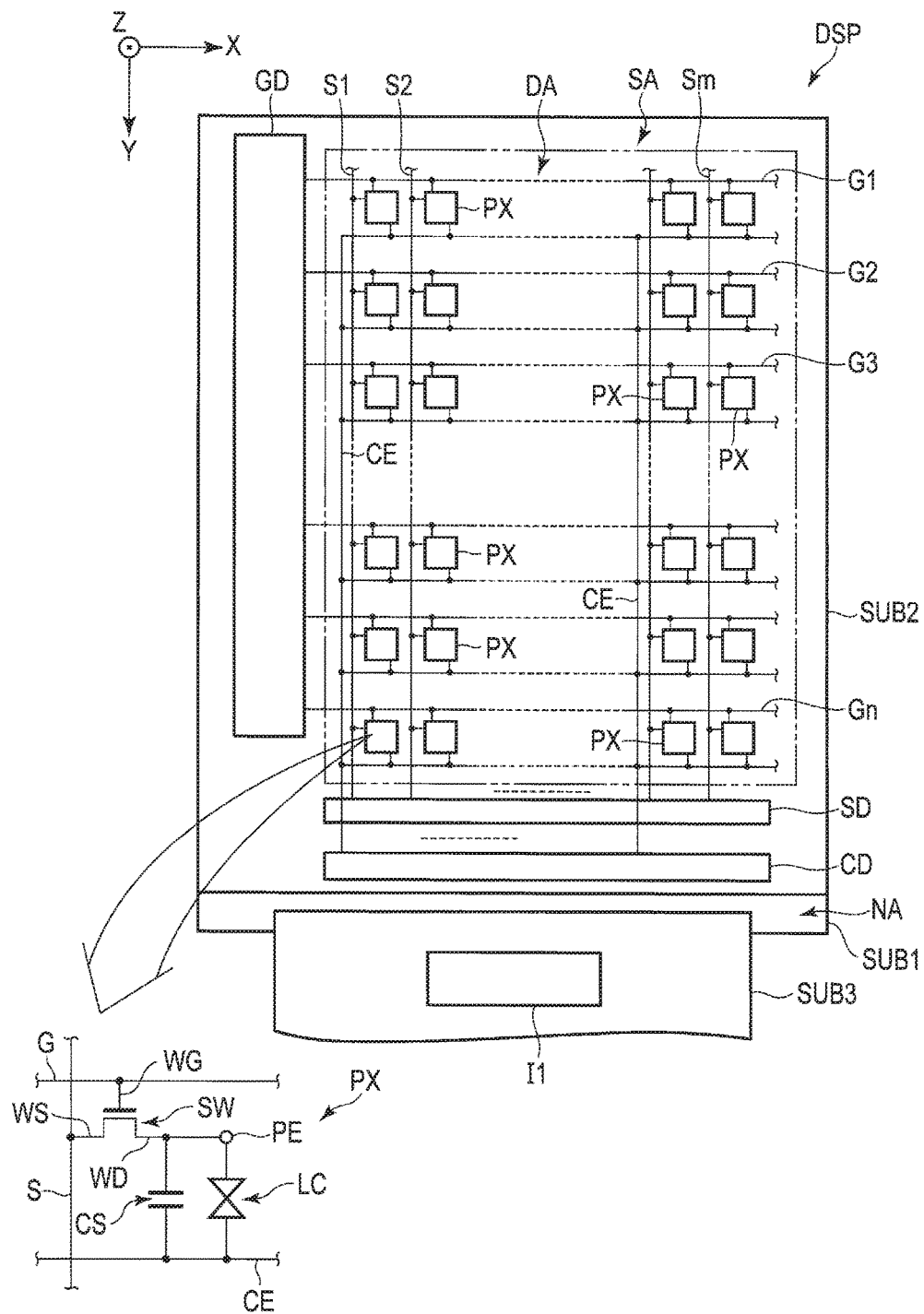
F I G. 1

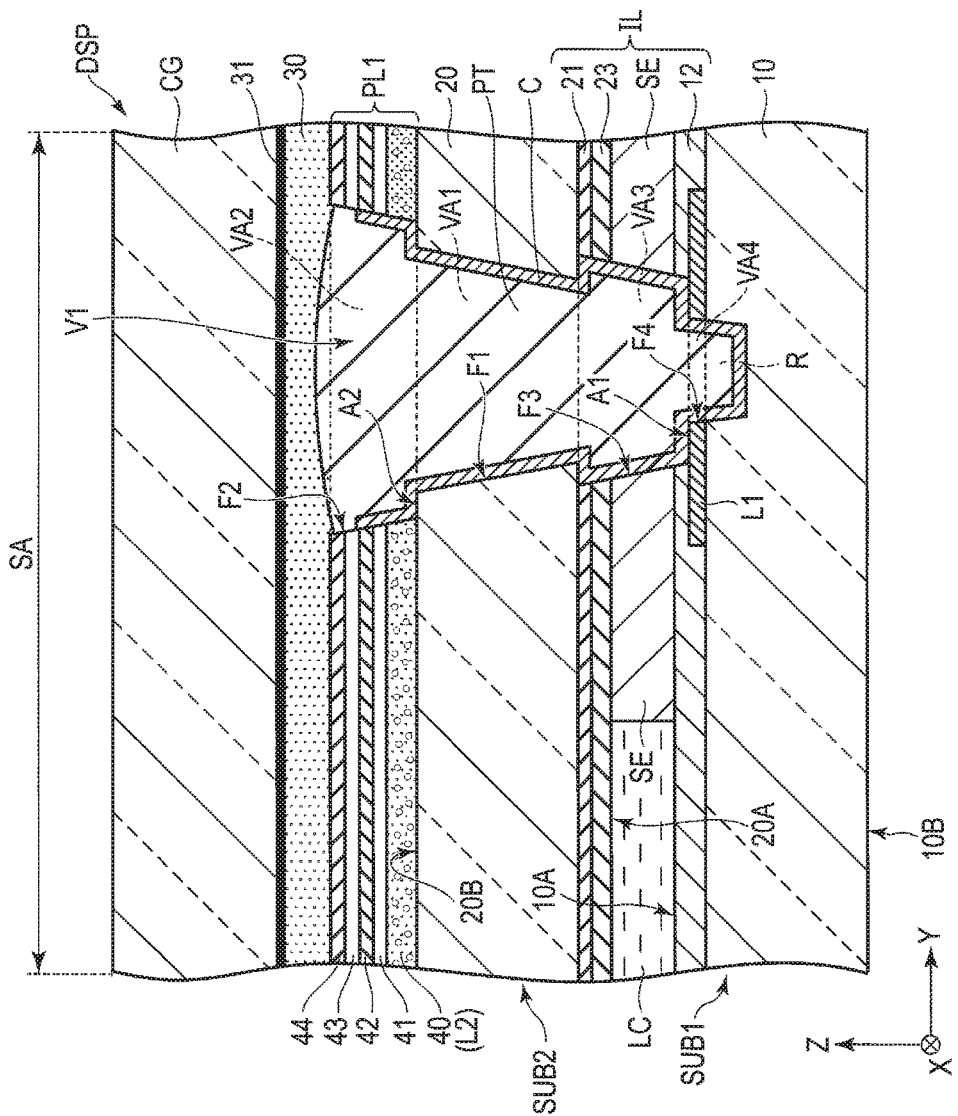
F I G. 3

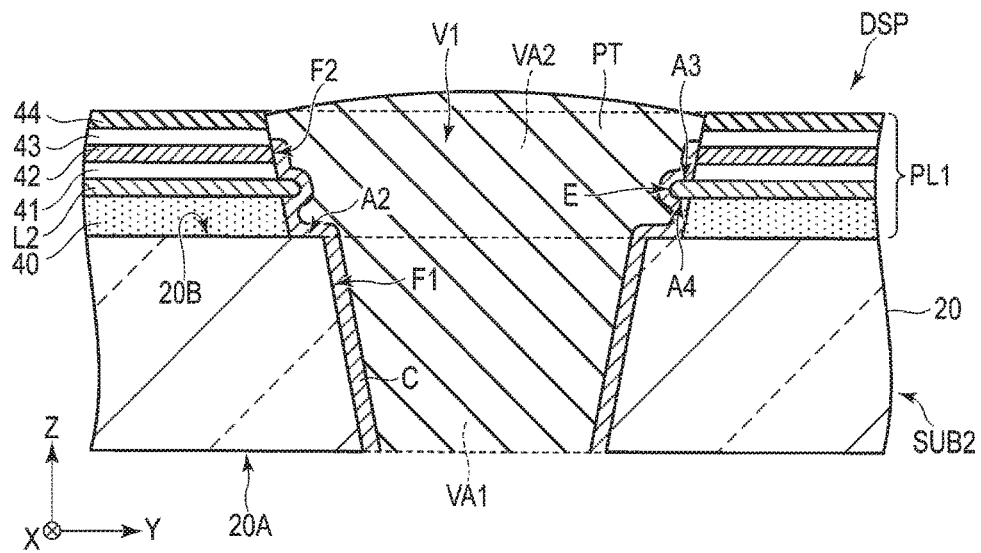
F I G. 9
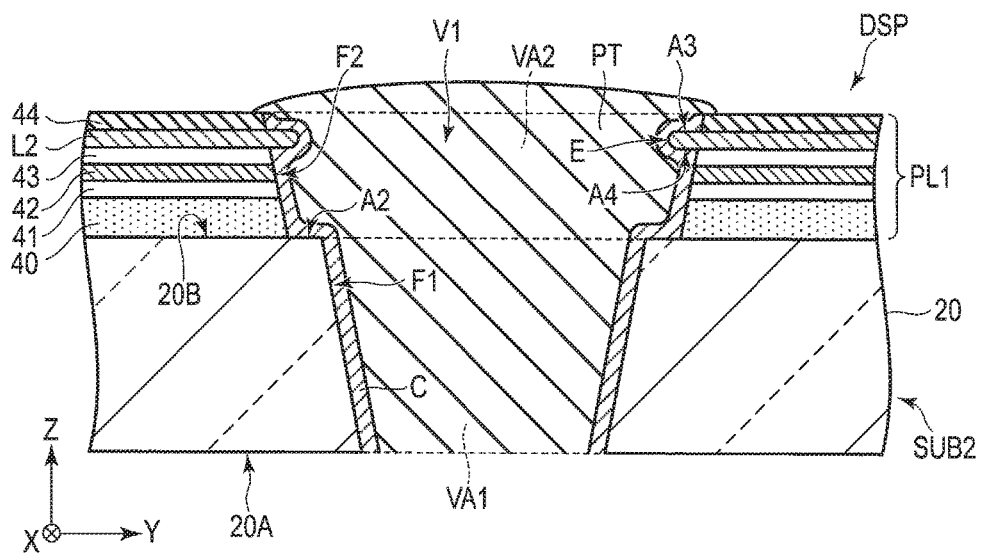
F I G. 10

DISPLAY DEVICE

CROSS-REFERENCE TO RELATED APPLICATIONS

This application is based upon and claims the benefit of priority from Japanese Patent Application No. 2016-149577, filed Jul. 29, 2016, the entire contents of which are incorporated herein by reference.

FIELD

Embodiments described herein relate generally to a display device.

BACKGROUND

As an example of a display device, a liquid crystal display device is known. A liquid crystal display device comprises an array substrate on which a pixel electrode and a switching element are formed, a counter-substrate which is opposed to the array substrate, and a liquid crystal layer which is arranged between the array substrate and the counter-substrate.

When the liquid crystal display device is touched from the counter-substrate side, static electricity may be built up on the counter-substrate. If an electric field produced by such static electricity or an electric field applied from the outside of the liquid crystal display device acts on the liquid crystal layer, the liquid crystal molecules will be out of alignment, and the display quality will be degraded. Further, in the manufacturing process of the liquid crystal display device also, static electricity may be built up on the counter-substrate. When this static electricity is discharged, various wires, circuits and the like will be damaged, and the manufacturing yield will be reduced.

To prevent the degradation of the display quality and the reduction of the manufacturing yield, for example, a technique of disposing a conductive layer on the outer surface of the counter-substrate and connecting the conductive layer to the grounded line of the array substrate with a conductive tape has been proposed. In this structure, it is possible to prevent the static buildup of the counter-substrate and block the electric field from the outside by the conductive layer.

SUMMARY

The present disclosure generally relates to a display device.

According to one embodiment, a display device includes first and second substrates, a display function layer, a polarizer, and a connecting material. The first substrate includes a first conductive layer. The second substrate includes a basement having first and second surfaces. The display function layer is disposed between the substrates. The polarizer is disposed above the second surface and includes a second conductive layer. The connecting material electrically connects the first and second conductive layers. The basement has a first hole. The polarizer has a second hole. The connecting material contacts the first and second conductive layers via the first and second holes.

Additional features and advantages are described herein, and will be apparent from the following Detailed Description and the figures.

BRIEF DESCRIPTION OF THE DRAWINGS

FIG. 1 is a plan view showing an example of the structure of a display device of a first embodiment.

FIG. 3 is a sectional view schematically showing a surrounding area of the display device of the first embodiment.

FIG. 9 is a sectional view schematically showing a part of a display device of a second embodiment.

FIG. 10 is a sectional view schematically showing a part of a display device of a third embodiment.

DETAILED DESCRIPTION

Figure 2:
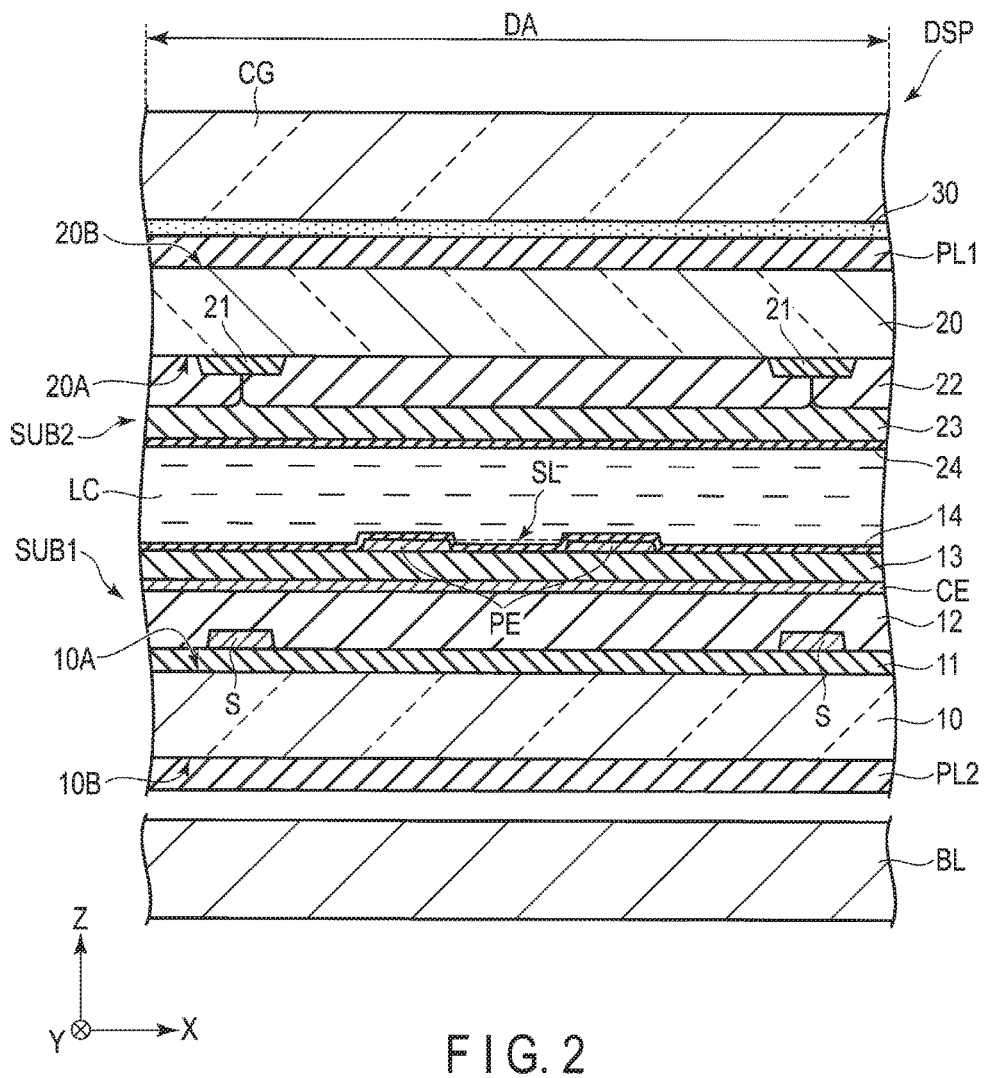
FIG. 2 is a sectional view schematically showing a display area of the display device of the first embodiment.

In general, according to one embodiment, a display device comprises a first substrate, a second substrate, a display function layer, a polarizer, and a connecting material. The first substrate includes a first conductive layer. The second substrate includes a basement which has a first surface opposed to the first substrate and a second surface opposite to the first surface. The display function layer is disposed between the first substrate and the second substrate. The polarizer is disposed above the second surface of the basement and includes a second conductive layer. The connecting material electrically connects the first conductive layer and the second conductive layer to each other. The basement has a first hole. The polarizer has a second hole which communicates with the first hole. The connecting material is in contact with the first conductive layer and the second conductive layer via the first hole and the second hole.

According to another embodiment, a display device comprises a first substrate, a second substrate, a display function layer, a second conductive layer, and a connecting material. The first substrate includes a first conductive layer. The second substrate includes a basement which has a first surface opposed to the first substrate and a second surface opposite to the first surface. The display function layer is disposed between the first substrate and the second substrate. The second conductive layer is disposed above the second surface of the basement and is opposed to a display area where an image is displayed. The connecting material electrically connects the first conductive layer and the second conductive layer to each other. The basement has a first hole. The connecting material is in contact with the first conductive layer and the second conductive layer via the first hole. The first conductive layer is grounded.

According to these structures, it is possible to provide a display device which can improve display quality and enhance a manufacturing yield.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In each embodiment, a liquid crystal display device will be disclosed as an example of a display device. This liquid crystal display device can be used in various devices such as a smartphone, a tablet computer, a mobile phone, a notebook computer, an in-car device, and a game console. The main structure described in each embodiment is also applicable to various other devices such as a self-luminous display device such as an organic electroluminescent display device, an electronic paper display device comprising an electrophoresis element, etc., a display device adopting microe-lectromechanical systems (MEMS), and a display device adopting electrochromism.

First Embodiment

FIG. 1 is a plan view showing an example of the structure of a liquid crystal display device DSP (hereinafter referred to as a display device DSP) of the first embodiment. In the drawing, a first direction X, a second direction Y, and a third direction Z orthogonally cross each other but may cross each other at any angle other than an angle of 90 degrees. The first direction X and the second direction Y correspond to the directions parallel to the surface of a substrate which constitutes the display device DSP, and the third direction Z corresponds to the thickness direction of the display device DSP.

The display device DSP comprises a first substrate SUB1 (array substrate), a second substrate SUB2 (counter-substrate), a wiring substrate SUB3, and an IC chip I1. The first substrate SUB1 and the second substrate SUB2 are opposed to each other in the third direction Z. In the following explanation, a direction from the first substrate SUB1 toward the second substrate SUB2 is referred to as upward (or merely above), and a direction from the second substrate SUB2 toward the first substrate SUB1 is referred to as downward (or merely below). Further, a view from the second substrate SUB2 toward the first substrate SUB1 is referred to as a plan view.

The display device DSP includes a display area DA which displays an image, and a frame-like surrounding area SA which surrounds the display area DA. The display area DA and the surrounding area SA correspond to an area in which the substrate SUB1 and the substrate SUB2 are opposed to each other. In the example shown in FIG. 1, the display device DSP includes an unopposed area NA in which the first substrate SUB1 is not opposed to the second substrate SUB2.

The wiring substrate SUB3 is connected to the first substrate SUB1 in the unopposed area NA. The wiring substrate SUB3 is, for example, a flexible substrate. In the example shown in FIG. 1, the IC chip I1 is mounted on the wiring substrate SUB3. Note that the IC chip I1 may be mounted on the unopposed area NA or may be mounted on an external circuit board which is connected to the wiring substrate SUB3.

The display device DSP includes pixels PX in the display area DA. Here, a pixel corresponds to a minimum unit which is individually controllable according to a pixel signal. The pixels PX are arranged in a matrix in the first direction X and the second direction Y.

Further, the display device DSP includes scanning lines G (G1 to Gn), signal lines S (S1 to Sm), a common electrode CE, and the like in the display area DA. The scanning lines G extend in the first direction X and are arranged in the second direction Y. The signal lines S extend in the second direction Y and are arranged in the first direction X. Note that the scanning line G and the signal line S do not necessarily extend linearly but may be partially bent. The common electrode CE is arranged over the pixels PX. The scanning line G, the signal line S, and the common electrode CE are drawn to the surrounding area SA. In the surrounding area SA, the scanning line G is connected to a scanning line drive circuit GD, the signal line S is connected to a signal line drive circuit SD, and the common electrode CE is connected to a common electrode drive circuit CD. The scanning line drive circuit GD, the signal line drive circuit SD, and the common electrode drive circuit CD may be formed on the first substrate SUB1 or may be partially or entirely incorporated in the IC chip I1.

Each pixel PX includes a switching element SW, a pixel electrode PE, the common electrode CE, a liquid crystal layer LC, and the like. The liquid crystal layer LC is disposed between the first substrate SUB1 and the second substrate SUB2 and corresponds to a display function layer in the present embodiment. The switching element SW is formed of, for example, a thin-film transistor (TFT) and is electrically connected to the scanning line G and the signal line S. More specifically, the switching element SW includes a gate electrode WG, a source electrode WS, and a drain electrode WD. The gate electrode WG is electrically connected to the scanning line G. In the example illustrated, an electrode electrically connected to the signal line S is referred to as the source electrode WS, and an electrode electrically connected to the pixel electrode PE is referred to as the drain electrode WD.

The scanning line G is connected to the switching element SW of each of the pixels PX which are arranged in the first direction X. The signal line S is connected to the switching element SW of each the pixels PX which are arranged in the second direction Y. Each pixel electrode PE is opposed to the common electrode CE, and drives the liquid crystal layer LC by an electric field which is produced between the pixel electrode PE and the common electrode CE. A storage capacitor CS for holding a pixel potential is formed, for example, between the common electrode CE and the pixel electrode PE.

FIG. 2 is a sectional view schematically showing a part of the display device DSP in the display area DA. Here, a cross-section of the display device DSP taken along the first direction X is illustrated. The illustrated display device DSP has a structure conforming to a display mode mainly using a lateral electric field which is substantially parallel to a substrate surface. Note that the display device DSP may have a structure conforming to a display mode using a longitudinal electric field which is perpendicular to a substrate surface, an electric field which is oblique to a substrate surface, or a combination thereof. In the display mode using the lateral electric field, for example, it is possible to adopt such a structure where either the first substrate SUB1 or the second substrate SUB2 includes both the pixel electrode PE and the common electrode CE. In the display mode using the longitudinal electric field or the oblique electric field, for example, it is possible to adopt such a structure where the first substrate SUB1 includes one of the pixel electrode PE and the common electrode CE, and the second substrate includes the other of the pixel electrode PE and the common electrode CE. Note that the substrate surface here is a surface parallel to the X-Y plane.

The first substrate SUB1 includes a first basement 10 (first insulating substrate), the signal line S, the common electrode CE, the pixel electrode PE, a first insulating layer 11, a second insulating layer 12, a third insulating layer 13, a first alignment film 14, and the like. Note that the switching element SW and the scanning line G, various insulating layers interposed therebetween, and the like are not illustrated.

The first basement 10 has a first surface 10A which is opposed to the second substrate SUB2, and a second surface 10B which is opposite to the first surface 10A. The first insulating layer 11 is provided above the first surface 10A. The signal line S is provided above the first insulating layer 11. The second insulating layer 12 is provided above the signal line S and the first insulating layer 11. The common electrode CE is provided above the second insulating layer 12. The third insulating layer 13 is provided above the common electrode CE. The pixel electrode PE is provided above the third insulating layer 13. The pixel electrode PE is opposed to the common electrode CE via the third insulating layer 13. In the example shown in FIG. 2, the pixel electrode PE has one slit SL. Note that the pixel electrode PE may have more than one slit SL or may not have any slit SL at all. The first alignment film 14 covers the pixel electrode PE and the third insulating layer 13.

The scanning line G and the signal line S may be formed of a metal material such as molybdenum, tungsten, titanium, or aluminum or an alloy material thereof, and may have a single layer structure or a multilayer structure. The common electrode CE and the pixel electrode PE may be formed of, for example, a transparent conductive material such as indium tin oxide (ITO) or indium zinc oxide (IZO). For example, the first insulating layer 11 and the third insulating layer 13 are inorganic insulating layers, and the second insulating layer 12 is an organic insulating layer.

Note that the structure of the first substrate SUB1 is not limited to the example in the drawing, and that the pixel electrode PE may be located between the second insulating layer 12 and the third insulating layer 13, and the common electrode CE may be located between the third insulating layer 13 and the first alignment film 14. Further, both the pixel electrode PE and the common electrode CE may be formed in the shape of a comb and disposed in the same layer in such a manner as to be engaged with each other.

The second substrate SUB2 includes a second basement 20 (second insulating substrate), a light-shielding layer 21, a color filter 22, an overcoat film 23, a second alignment film 24, and the like.

The second basement 20 has a first surface 20A which is opposed to the first substrate SUB1, and a second surface 20B which is opposite to the first surface 20A. The light-shielding layer 21 and the color filter 22 are provided below the first surface 20A. The light-shielding layer 21 delimits the pixels and is located directly above the signal lines S.

The color filter 22 is opposed to the pixel electrode PE and partially overlaps the light-shielding layer 21. The color filter 22 includes a red color filter, a green color filter, a blue color filter, and the like. The overcoat layer 23 covers the color filter 22. The second alignment film 24 covers the overcoat 23. The liquid crystal layer LC is disposed between the first alignment film 14 and the second alignment film 24. Note that the color filter 22 may be disposed on the first substrate SUB1 instead.

In the present embodiment, each of the first basement 10 and the second basement 20 is, for example, a glass substrate formed of alkali-free glass, etc. Each of the first basement 10 and the second basement 20 may also be resin substrates formed of polyimide, etc.

The display device DSP further includes a cover glass CG (cover member), an illumination device BL, a first polarizer PL1 disposed between the cover glass CG and the second substrate SUB2, and a second polarizer PL2 disposed between the first substrate SUB1 and the illumination device BL. Each of the polarizer PL1 and the polarizer PL2 is opposed to at least the whole display area DA. The display device DSP may further include optical elements such as retardation films between the cover glass CG and the second substrate SUB2 and between the first substrate SUB1 and the illumination device BL.

The first polarizer PL1 is attached to the second surface 20B via an adhesive layer 40 which will be described later. Similarly, the second polarizer PL2 is attached to the second surface 10B via an adhesive layer. The cover glass CG is opposed to the first polarizer PL1 and is attached to the first polarizer PL1 via an adhesive layer 30.

Note that the display device DSP shown in FIG. 2 is illustrated as a structural example applicable to a transmissive display device which displays an image by selectively transmitting light from the illumination device BL. However, the display device DSP is not limited to this example and may be a reflective display device which displays an image by selectively reflecting light which enters from above the second substrate SUB2 or a transflective display device which performs the function of a transmissive display device and the function of a reflective display device.

In the present embodiment, the first substrate SUB1 includes a first conductive layer by which the first substrate SUB1 is grounded, the first polarizer PL1 includes a second conductive layer, and the first conductive layer and the second conductive layer are electrically connected to each other. A structure for connecting the first conductive layer and the second conductive layer will be described below.

FIG. 3 is a schematic sectional view of a part of the display device DSP in the surrounding area SA. Here, illustrations of the elements provided in the first substrate SUB and the second substrate SUB2, the illumination device BL, and the second polarizer PL2 shown in FIG. 2 are appropriately omitted.

The first substrate SUB1 and the second substrate SUB2 are attached to each other via a sealant SE. The sealant SE is formed, for example, in the shape of a ring which surrounds the display area DA (see FIG. 4). In the example shown in FIG. 3, the second insulating layer 12 is disposed between the sealant SE and the first basement 10, and the light-shielding layer 21 and the overcoat layer 23 are disposed between the sealant SE and the second basement 20. The sealant SE, the second insulating layer 12, the light-shielding layer 21, and the overcoat layer 23 constitute an insulating layer IL which is, for example, an organic insulating layer.

Note that the insulating layer IL may further include the first alignment film 14 and the second alignment film 24, and the like shown in FIG. 2. Further, the insulating layer IL may not include at least one of the second insulating layer 12, the overcoat layer 23, and the light-shielding layer 21.

The first substrate SUB1 includes a grounded first conductive layer L1. In the example shown in FIG. 3, the first conductive layer L1 is formed on the first surface 10A and is covered with the second insulating layer 12. The structure is not limited to this example, various insulating layers or various conductive layers may be disposed between the first conductive layer L1 and the first basement 10 or between the first conductive layer L1 and the second insulating layer 12. The first conductive layer L1 is formed of a metal material such as molybdenum, tungsten, titanium, aluminum, silver, copper, or chromium, an alloy of these metal materials, or a transparent conductive material such as ITO or IZO. The first conductive layer L1 may have a single layer structure or a multilayer structure.

The first polarizer PL1 includes the adhesive layer 40, a first protection layer 41, a polarization layer 42, a second protection layer 43, and a coat layer 44 in order from the second substrate SUB2 side. In the example shown in FIG. 3, the first polarizer PL1 is attached to the second surface 20B with the adhesive layer 40. Note that various insulating layers or various conductive layers may be disposed between the adhesive layer 40 and the second basement 20.

The polarization layer 42 is formed mainly of, for example, polyvinyl alcohol (PVA), and absorbs a specific polarization component of light and transmits the other polarization component of light. The first protection layer 41 and the second protection layer 43 are formed of, for example, triacetylcellulose (TAC). The polarization layer 42 is sandwiched between the first protection layer 41 and the second protection layer 43 and is protected by the first protection layer 41 and the second protection layer 43 from both sides. The coat layer 44 is a layer which has a function according to its purpose. As an example, a hard coat layer (HC), an anti-glare layer (AG), an antireflection layer (AR), a low reflection layer (LR) or the like can be applied to the coat layer 44. The structure of the second polarizer PL2 is similar to the above-described structure of the first polarizer PL1.

In the present embodiment, the adhesive layer 40 is a conductive adhesive layer. It is possible to make the adhesive layer 40 electrically conductive, for example, by mixing an organic conductor with the adhesive layer 40. This adhesive layer 40 corresponds to a second conductive layer L2 in the present embodiment. The adhesive layer 40 is formed across the entire area between the first polarizer PL1 and the second basement 20. Therefore, the adhesive layer 40 is opposed to the whole display area DA.

The second basement 20 has a hole VA1 (first hole) which penetrates from the first surface 20A to the second surface 20B. The first polarizer PL1 has a hole VA2 (second hole) which corresponds to the hole VA1. The insulating layer IL has a hole VA3 (third hole) which corresponds to the holes VA1 and VA2. The first conductive layer L1 has a hole VA4 (fourth hole) which corresponds to the holes VA1 to VA3. Further, the first basement 10 has a recess R which corresponds to the holes VA1 to VA4 on the first surface 10A. Note that the hole VA3 penetrates the layers constituting the insulating layer IL, that is, the sealant SE, the second insulating layer 12, the light-shielding layer 21, and the overcoat layer 23 in the example shown in FIG. 3.

The recess R is formed from the first surface 10A toward the second surface 10B, but in the example illustrated, the recess R does not penetrate up to the second surface 10B. As an example, the depth of the recess R in the third direction Z is about ⅕ to ½ of the thickness of the first basement 10.

Note that, in place of the recess R, the first basement 10 may have a hole which penetrates from the first surface 10A to the second surface 10B.

The centers of the holes VA1 to VA4 and the recess R are aligned with each other in a plan view and are located on the same straight line which extends in the third direction Z, and the holes VA1 to VA4 and the recess R constitute a contact hole V1. In a plan view, each of the holes VA1 to VA4 and the recess R is, for example, a regular circle but may be an ellipse or in various other shapes.

In the example shown in FIG. 3, the width (inner diameter) of each of the holes VA1 to VA4 gradually decreases toward the lower end. That is, an inner surface F1 of the hole VA1, an inner surface F2 of the hole VA2, an inner surface F3 of the hole VA3, and an inner surface F4 of the hole VA4 are inclined with respect to the third direction Z and taper off. In the example shown in FIG. 3, the cross-section of each of the inner surfaces F1 to F4 is linear but may be curved instead. Further, the holes VA1 to VA4 may has such a shape that the width (inner diameter) gradually decreases toward the upper end or such a shape that the width is constant (the inner surfaces F1 to F4 are parallel to the third direction Z).

In the vicinity of the boundary between the hole VA3 and the hole VA4, the width of the hole VA3 is greater than the width of the hole VA4. Accordingly, the first conductive layer L1 includes a first area A1 which is exposed between the edge of the inner diameter of the hole VA3 and edge of the inner diameter of the hole VA4. For example, the first area A1 has the shape of a ring which completely surrounds the circumference of the hole VA4 in a plan view. Note that the first area A1 may be provided in a part of the circumference of the hole VA4 or may be provided intermittently around the circumference of the hole VA4.

In the vicinity of the boundary between the hole VA1 and the hole VA2, the width of the hole VA2 is greater than the width of the hole VA1. Accordingly, the second surface 20B includes a second area A2 which is exposed between the edge of the inner diameter of the hole VA1 and edge of the inner diameter of the hole VA2. For example, the second area A2 has the shape of a ring which completely surrounds the circumference of the hole VA1 in a plan view. Note that the second area A2 may be provided in a part of the circumference of the hole VA1 or may be provided intermittently around the circumference of the hole VA1.

The display device DSP further includes a connecting material C which electrically connects the first conductive layer L1 and the second conductive layer L2 (adhesive layer 40) via the holes VA1 to VA4. In the example shown in FIG. 3, the connecting material C continuously covers the inner surfaces F1 to F4 of the holes VA1 to VA4, the inner surface of the recess R, the first area A1, and the second area A2. As an example, it is preferable that the connecting material C should contain a metal material such as silver, and that fine particles thereof should contain fine particles of a particle diameter of the order of several nanometers to several tens of nanometers.

The connecting material C is in contact with the adhesive layer 40 on the inner surface F2 of the hole VA2. Further, the connecting material C is in contact with the first conductive layer L1 on the inner surface F4 of the hole VA4 and in the first area A1. Therefore, the first conductive layer L1 and the second conductive layer L2 (adhesive layer 40) are electrically connected to each other by the connecting material C. Since the first conductive layer L1 is grounded, the connecting material C and the second conductive layer L2 are grounded, accordingly.

The conductive material C is in contact with the first conductive layer L1 not only on the inner surface F4 but also in the first area A1. Therefore, as compared to a case where the conductive material C is in contact with the first conductive layer L1 only on the inner surface F4, the contact area can be increased, and the reliability of the electrical connection can be enhanced. Further, the connecting material C in the hole VA2 is in contact with the inner surface of the adhesive layer 40 and is also in contact with the second area A2. Therefore, the attachment to the adhesive layer 40 can be enhanced.

The inside of the connecting material C (the holes VA1 and VA2) is filled with a protection material PT which covers the connecting material C. The protection material PT covers the end of the connecting material C located in the hole VA2. In the example shown in FIG. 3, a part of the protection material PT projects upward from the hole VA2. Note that the protection material PT may not project from the hole VA2. The protection material PT can be formed of, for example, an organic insulating material. The protection material PT prevents corrosion of the elements and the connecting material C exposed in the contact hole V1 by moisture, etc., from the outside. Further, the protection material PT prevents development of unevenness associated with the contact hole V1.

The coat layer 44 and the upper surface of the protection material PT are covered with the above-described adhesive layer 30. The cover glass CG is attached via the adhesive layer 30. Since the cover glass CG is provided, even if the formation of the contact hole V1 causes a decrease in the strength of the second substrate SUB2 or the like, the vicinity of the contact hole V1 is sufficiently protected. Further, the unevenness associated with the contact hole V1 will be smoothed.

The cover glass CG includes, for example, a decorative layer 31 (light-shielding layer) on the surface opposed to the first polarizer PL1. The decorative layer 31 is opposed to the surrounding area SA and opens in accordance with the shape of the above-described display area DA. As the decorative layer 31 is provided, the contact hole V1 cannot be seen from the outside.

Figure 4:
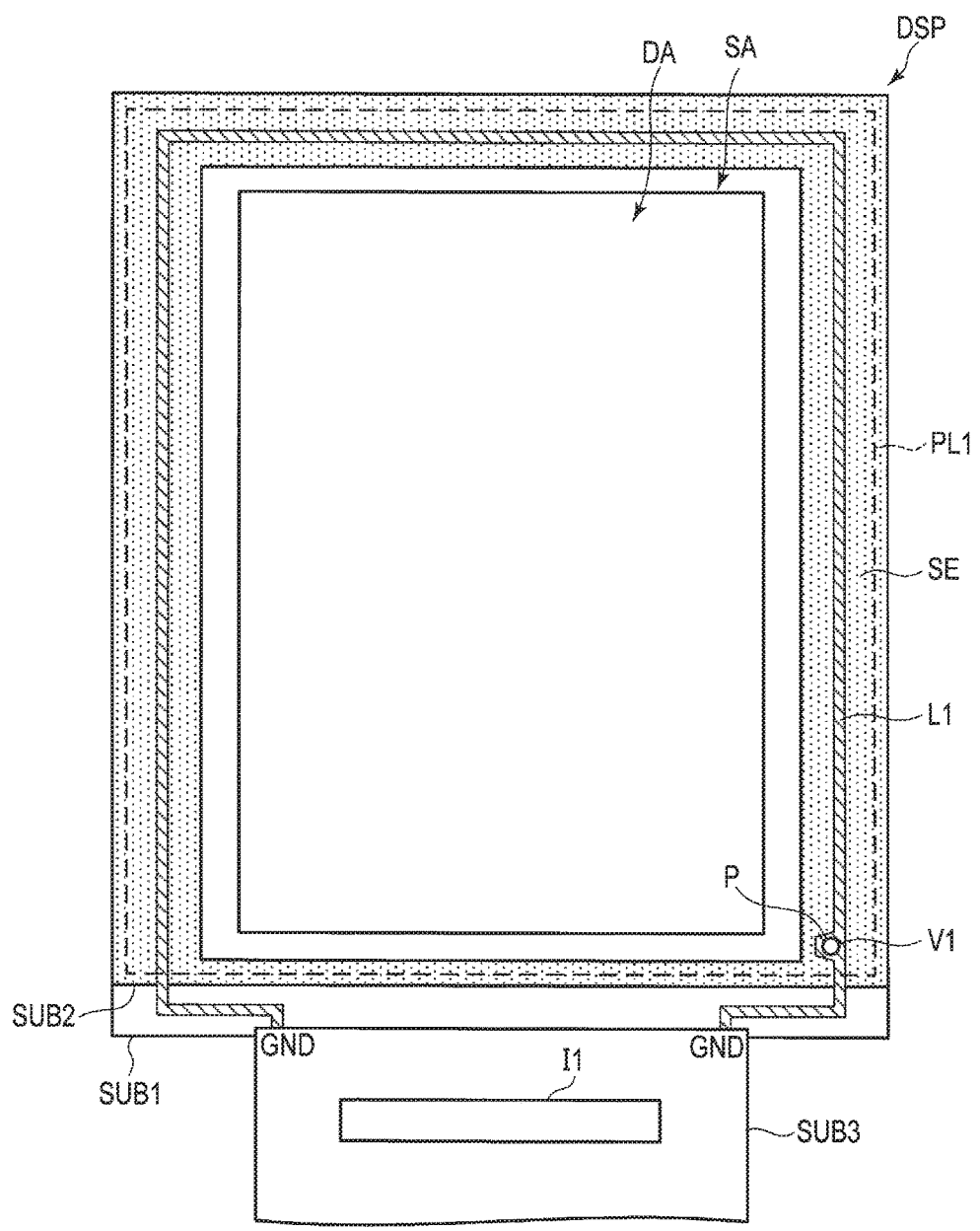
FIG. 4 is a plan view schematically showing an example of the structure of an element related to a contact hole of the first embodiment.

FIG. 4 is a schematic plan view of the display device DSP, mainly showing a structural example of an element related to the contact hole V1.

The sealant SE is provided in the surrounding area SA and surrounds the display area DA. The first polarizer PL1 overlaps the whole display area DA in a plan view. The adhesive layer 40 (second conductive layer L2) shown in FIG. 3 also overlaps the whole display area DA in a plan view. The edge of the first polarizer PL1 overlaps the sealant SE, for example, in the surrounding area SA. The edge of the first polarizer PL1 may be aligned with the edge of the second substrate SUB2 instead.

In the example shown in FIG. 4, the first conductive layer L1 surrounds the display area DA. In the surrounding area SA, the first conductive layer L1 overlaps the sealant SE and the first polarizer PA1 in a plan view. Both ends of the first conductive layer L1 are connected to the wiring substrate SUB3. A ground potential (GND) is applied to the first conductive layer L1 via the wiring substrate SUB3. The ground potential is a fixed potential and is, for example, 0 V. This first conductive layer L1 functions as a guard ring which prevents an electric field produced by static electricity or an external electric field from acting on the display area DA. Note that the first conductive layer L1 does not necessarily have the shape of the example shown in FIG. 4 and may have various other shapes. For example, the first conductive layer L1 may not surround the display area DA. Alternatively, the first conductive layer L1 may not function as a guard ring but may function simply as a wire for connecting the second conductive layer L2 and the wiring substrate SUB3. Further, in light of protection from the effect of the external electric field on the various circuits and the like, the guard ring should preferably be located in the outermost area with respect to the circuits which are formed on the first substrate SUB1, and the guard ring may also be formed along the edge of the first substrate SUB1.

The first conductive layer L1 has a pad P in a position which overlaps the sealant SE. For example, the pad P corresponds to an area where the width of the first conductive layer L1 is increased. The contact hole V1 is provided in a position which overlaps the pad P in a plan view. In the example shown in FIG. 4, the pad P and the contact hole V1 are provided near the lower right corner of the surrounding area SA. Note that the pad P and the contact hole V1 may be provided in another position and more than one pad P and more than one contact hole V1 may be provided. Further, it is also possible to provide the contact hole V1 without the pad P in a position which overlaps the first conductive layer L1 of a constant width.

According to the above-described structure of the present embodiment, since the adhesive layer 40 (second conductive layer L2) is grounded via the first conductive layer L1, the buildup of the static electricity of the first polarizer PL1 or the second substrate SUB2 can be prevented. Therefore, the damage of various wires or circuits caused by the static discharge can be prevented, and the manufacturing yield can be improved. Further, when the display device DSP is in operation, the effect of the electric filed produced by the static electricity and the like on the liquid crystal layer LC can be prevented, and the display quality can be improved.

Still further, in the present embodiment, the first conductive layer L1 and the second conductive layer L2 are connected to each other via the contact hole V1. Therefore, the first conductive layer L1 and the second conductive layer L2 can be connected to each other in a significantly small space. Consequently, the frame of the display device DSP can be narrowed.

Still further, since the adhesive layer 40 included in the first polarizer PL1 is used as the second conductive layer L2, there is no need to add new layer. Therefore, the manufacturing process of the second conductive layer L2 will not be required, and the thickness of the display device DSP can be reduced.

Next, an example of the manufacturing process for connecting the first conductive layer L1 and the second conductive layer L2 will be described with reference to FIGS. 5 to 8. Note that each drawing mainly focuses on the second substrate SUB2 and the first polarizer PL1 and does not illustrate the first substrate SUB1 and the sealant SE.

Figure 5:
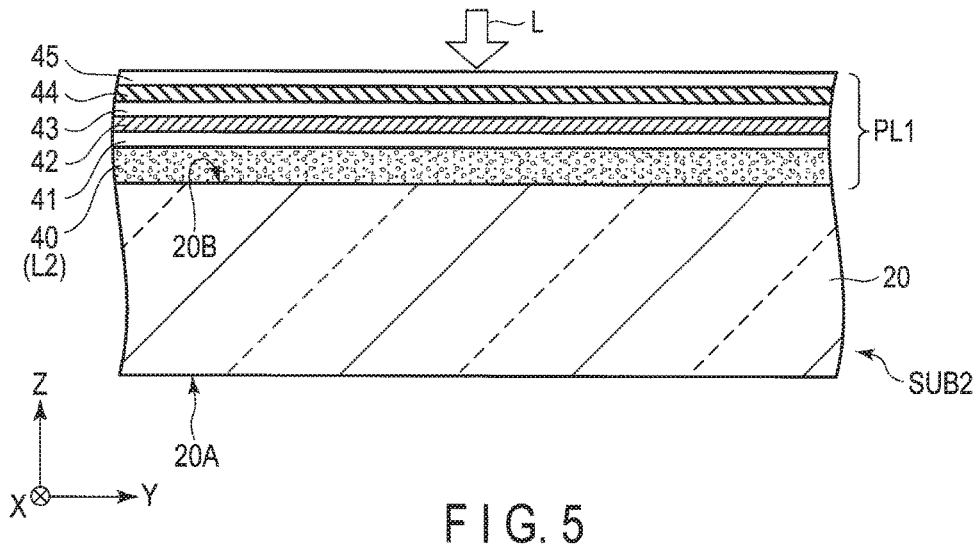
FIG. 5 is a diagram showing an example of the manufacturing process of the display device of the first embodiment.

Firstly, a liquid crystal panel on which the first substrate SUB1 and the second substrate SUB2, which are attached to each other with the sealant SE, and the liquid crystal layer LC are formed is prepared. Then, as shown in FIG. 5, the first polarizer PL1 is attached to the second surface 20B. At this stage, a protection film 45 is disposed on the upper surface of the coat layer 44. Further, the first polarizer PL1 which has not been attached yet includes a separator film on the lower surface of the adhesive layer 40. When the first polarizer PL1 is attached to the second basement 20, this separator film is removed. As the first polarizer PL1 is attached, the adhesive layer 40, which functions as the second conductive layer L2, is formed on the second surface 20B. It is also possible to apply an adhesive layer to the second surface 20B, thereby forming the second conductive layer L2 on the second surface 20B, and attach the first polarizer PL1 via the adhesive layer. In that case, the first polarizer PL1 where the separator film has not been removed yet may not include the adhesive layer 40.

Further, laser light L is applied from the upper surface side of the first polarizer PL1. As the laser light source, for example, a carbon dioxide gas laser device may be adoptable, but any laser device is adoptable as long as the laser device can drill a glass material and an organic material, and an excimer laser device and the like is also adoptable.

Figure 6:
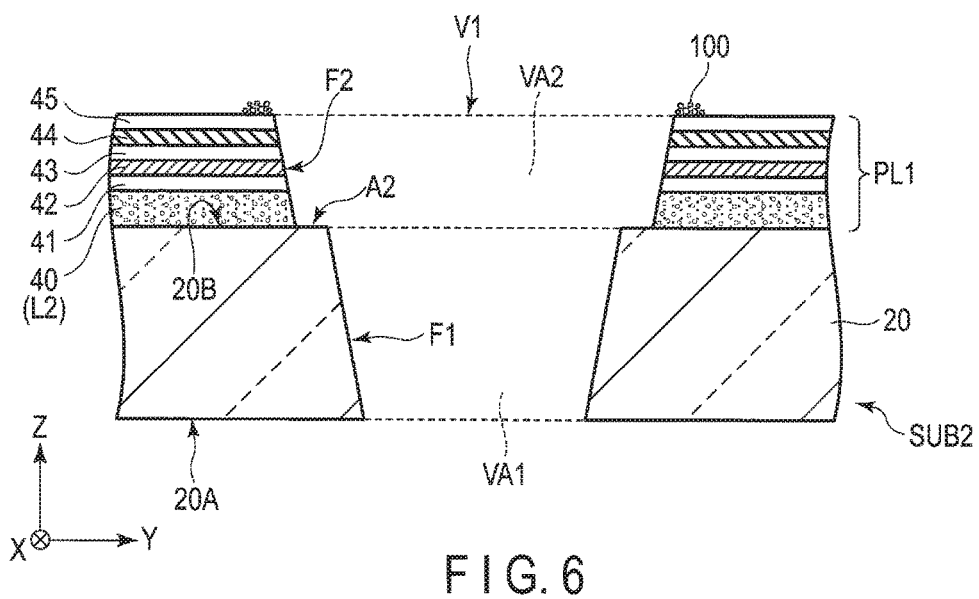
FIG. 6 is a diagram showing an example of the manufacturing process of the display device of the first embodiment.

As the laser light L is applied, as shown in FIG. 6, the hole VA2 which penetrates the first polarizer PL1, and the hole V1 which penetrates the second basement 20 are formed. Further, in the insulating layer IL including the sealant SE, the first conductive layer L1, and the first basement 10, the hole VA3, the hole VA4, and the recess R shown in FIG. 3 are formed by the laser light L. In this process, residues 100 of the melted second basement 20 and the like may be produced. For example, as shown in FIG. 6, the residues 100 are attached to the upper surface of the protection film 45 in the circumference of the hole VA2.

Generally, the melting point of the material of each layer which constitutes the first polarizer PL1 is lower than the melting point of the second basement 20. Therefore, when the laser light L is applied, the first polarizer PL1 melts or sublimates more easily than the second basement 20. Accordingly, as shown in FIG. 6, the inner diameter of the hole VA2 becomes greater than the inner diameter of the hole VA1, and the above-described second area A2 is formed on the second surface 20B. Similarly, since the melting point of the insulating layer IL is lower than the melting point of the first conductive layer L1, as shown in FIG. 3, the inner diameter of the hole VA3 becomes greater than the inner diameter of the hole VA4, and the above-described first area A1 is formed on the upper surface of the first conductive layer L1.

Figure 7:
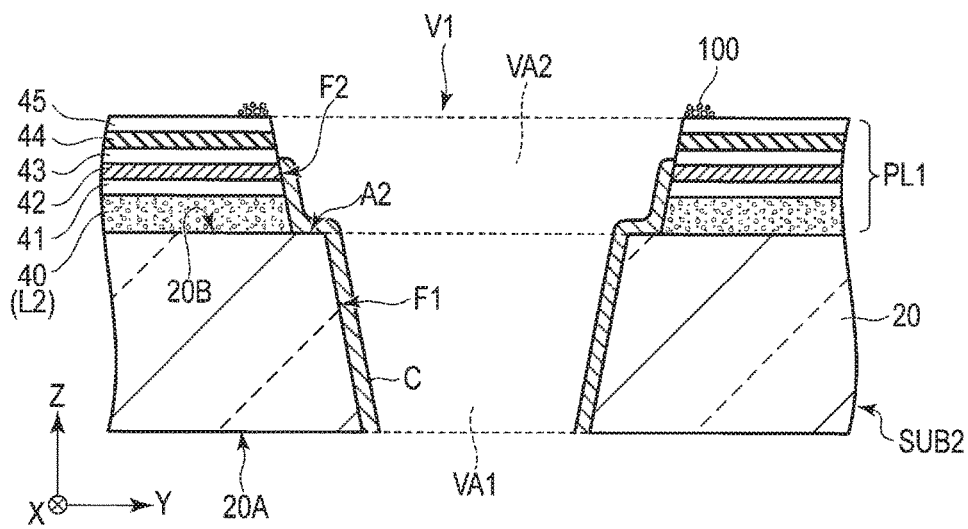
FIG. 7 is a diagram showing an example of the manufacturing process of the display device of the first embodiment.

Subsequently, as shown in FIG. 7, the connecting material C which electrically connects the first conductive layer L1 and the second conductive layer L2 is formed. More specifically, for example, in a vacuum environment, the connecting material C which is mixed with a solvent is injected into the contact hole V1, and the contact hole V1 is filled with the connecting material C. After that, the solvent is removed, and the volume of the connecting material C is reduced. In this way, the connecting material C which is attached to the inner surface of the contact hole V1 can be formed as shown in FIGS. 7 and 3.

Figure 8:
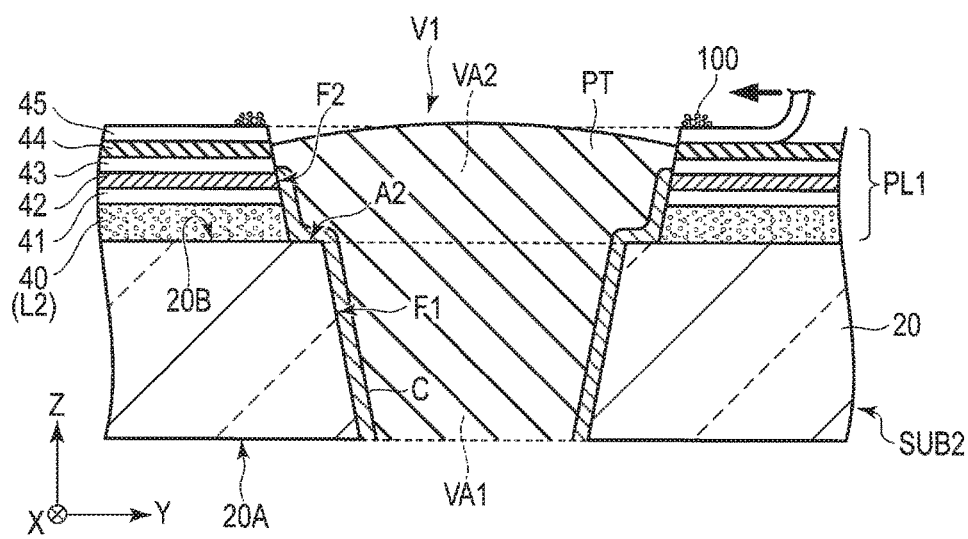
FIG. 8 is a diagram showing an example of the manufacturing process of the display device of the first embodiment.

Subsequently, the protection material PT is formed as shown in FIG. 8. Further, the protection film 45 is removed. As the protection film 45 is removed, the residues 100 are removed together with the protection film 45. After that, the cover glass CG is attached to the coat layer 44 via the adhesive layer 30, and the illumination device BL and the like are provided, and eventually, the display device DSP having the structure shown in FIG. 3 and the like is produced.

According to this manufacturing method, the holes VA1 to VA4 and the recess R can be collectively formed by the laser light L. Further, the first area A1 and the second area A2 can also be formed concurrently with the holes VA1 to VA4 and the recess R. Still further, the residues 100 produced in association with the formation of the contact hole V1 can be removed when the protection film 45 is removed.

Note that the holes VA1 to VA4 and the recess R may be appropriately formed by etching or various other processes.

According to the display device DSP and the manufacturing method of the same which have been described in the present embodiment, not only the above-described effects but also various other favorable effects can be achieved.

Second Embodiment

The second embodiment will be described. The present embodiment differs from the first embodiment mainly in the structure of the first polarizer PL1. Unless otherwise specified, the structure and the effect are the same as those of the first embodiment.

FIG. 9 is a schematic sectional view of a part of the display device DSP of the present embodiment. As in the case of the first embodiment, the first polarizer PL1 includes the adhesive layer 40, the first protection layer 41, the polarization layer 42, the second protection layer 43, and the coat layer 44 in order from the second substrate 20 side. Further, the first polarizer PL1 includes the second conductive layer L2 disposed between the adhesive layer 40 and the first protection layer 41. That is, the adhesive layer 40 and the second conductive layer L2 are different layers in the present embodiment. The adhesive layer 40 may be conductive or may be non-conductive. The second conductive layer L2 can be formed of a transparent conductive material such as ITO or IZO or an ultrathin metal layer.

The hole VA2 of the first polarizer PL1 also penetrates the second conductive layer L2. In the hole VA2, the second conductive layer L2 includes a third area A3 which is exposed from the first protection layer 41, and a fourth area A4 which is exposed from the adhesive layer 40. In the present embodiment, the first protection layer 41 and the adhesive layer 40 correspond to a first layer and a second layer between which the second conductive layer L2 is sandwiched. From another perspective, an edge E of the second conductive layer L2 projects in the hole VA2. For example, the third area A3 and the fourth area A4 have the shape of a ring along the inner surface F2 of the hole VA2 in a plan view. Note that the third area A3 and the fourth area A4 may be provided in a part of the inner surface F2 or may be provided intermittently along the inner surface F2.

The connecting material C continuously covers the edge E of the second conductive layer L2, the third area A3, and the fourth area A4 in the hole VA2. Therefore, the contact area between the second conductive layer L2 and the connecting material C increases, the reliability of the electrical connection improves, accordingly.

As in the case of the above-described first area A1 and second area A2, when the laser light is used for the formation of the hole VA2, the third area A3 and the fourth area A4 can be formed concurrently with the hole VA2. That is, since the melting point of the second conductive layer L2 formed of ITO or the like is generally higher than the melting point of the adhesive layer 40 or the first protection layer 41 formed of a resin material, the adhesive layer 40 or the first protection layer 41 melts or sublimates more easily than the second conductive layer L2. Therefore, as shown in FIG. 9, although the second conductive layer L2 is penetrated by the laser light, since the adhesive layer 40 and the first protection layer 41 are melted by the laser light more easily than the second conductive layer L2, the edge E of the second conductive layer L2 will be projected from the hole VA2, and the third area A3 and the fourth area A4 will be formed.

Accordingly, in the case of using laser light, the third area A3 and the fourth area A4 can be easily formed. Note that the hole VA2, and the third area A3 and the fourth area A4 may be appropriately formed by etching or various other processes.

Third Embodiment

The third embodiment will be described. The present embodiment differs from the above-describe embodiments mainly in the structure of the first polarizer PL1. Unless otherwise specified, the structure and the effect are the same as those of the above-described embodiments.

FIG. 10 is a schematic sectional view of a part of the display device DSP of the present embodiment. As in the case of the second embodiment, the first polarizer PL1 includes the adhesive layer 40, the first protection layer 41, the polarization layer 42, the second protection layer 43, and the coat layer 44 in order from the second substrate 20 side. As in the case of the second embodiment, the adhesive layer 40 and the second conductive layer L2 are different layers in the present embodiment. Here, the second conductive layer L2 is disposed between the second protection layer 43 and the coat layer 44.

In the hole VA2, the second conductive layer L2 includes the third area A3 which is exposed from the coat layer 44, and the fourth area A4 which is exposed from the second protection layer 43. In the present embodiment, the coat layer 44 and the second protection layer 43 correspond to the first layer and the second layer between which the second conductive layer L2 is sandwiched. The connecting material C continuously covers the edge E of the second conductive layer L2, the third area A3, and the fourth area A4 in the hole VA2.

According to the structure of the present embodiment, the same effect as that of the second embodiment can be achieved.

Note that the second embodiment and the third embodiment are of a case where the second conductive layer L2 includes both the third area A3 and the fourth area A4. However, the second conductive layer L2 may include only the third area A3 or only the fourth area A4 instead.

Further, the edge E of the second conductive layer L2 may not project in the second hole VA2. In that case, the second conductive layer L2 includes neither the third area A3 nor the fourth area A4, but since the edge E and the connecting material C are in contact with each other, the electrical connection between the first conductive layer L1 and the second conductive layer L2 can be ensured.

Still further, the layer structure of the first polarizer PL1 or the position of the second conductive layer L2 are not limited to those shown in FIGS. 9 and 10 and can be appropriately modified.

Fourth Embodiment

The fourth embodiment will be described. The present embodiment differs from the above-described embodiments mainly in the structure of the first polarizer PL1 and the structure of the second conductive layer L2. Unless otherwise specified, the structure and the effect are the same as those of the above-described embodiments.

Figure 11:
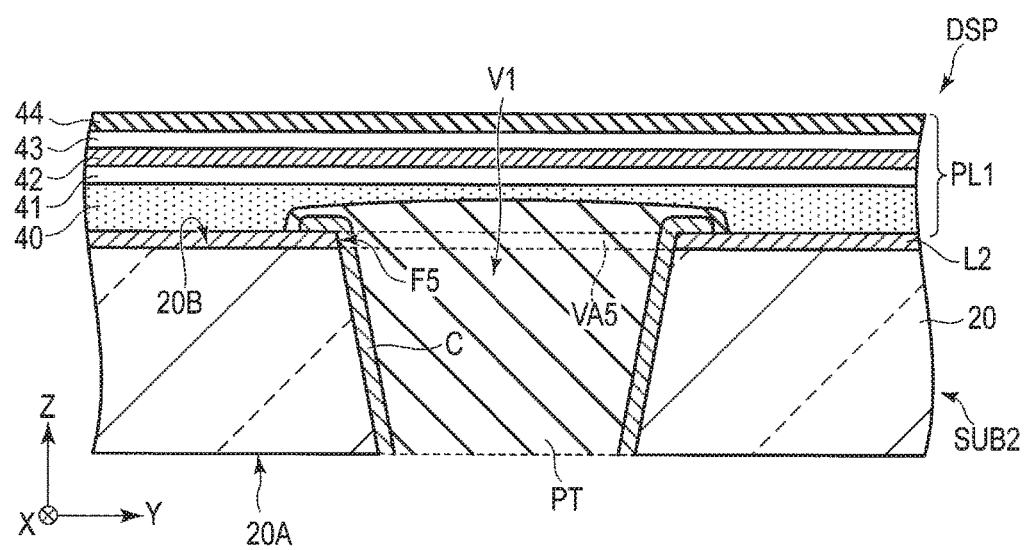
FIG. 11 is a sectional view schematically showing a part of a display device of a fourth embodiment.

FIG. 11 is a schematic sectional view of a part of the display device DSP of the present embodiment. In FIG. 11, the second conductive layer L2 is formed on the second surface 20B. The second conductive layer L2 is opposed to at least the whole display area DA. For example, the second conductive layer L2 can be formed of a transparent conductive material such as ITO or IZO.

The first polarizer PL1 does not have the above-described hole VA2. The second conductive layer L2 has a hole VA5 which corresponds to the hole VA1. The hole VA5 and the hole VA1, as well as the hole VA3, the hole VA4 and the recess R shown in FIG. 3 are located on the same straight line which extends in the third direction Z, and constitute the contact hole V1.

The connecting material C which connects the second conductive layer L2 and the above-described first conductive layer L1 to each other is in contact with an inner surface F5 of the second conductive layer L2 in the hole VA5. Further, in the example shown in FIG. 11, the connecting material C is also in contact with the upper surface of the second conductive layer L2 in the circumference of the hole VA5. The connecting material C is covered with the protection material PT. The protection material PT also covers a part of the upper surface of the second conductive layer L2.

The first polarizer PL1 is attached from above the second conductive layer L2 and the protection material PT via the adhesive layer 40. The adhesive layer 40 may be conductive or may be non-conductive. The second conductive layer L2 is grounded via the first conductive layer L1 and the connecting material C.

As in the case of the above-described embodiments, according to this structure, it is possible to prevent degradation of the display quality associated with an electric field produced by static electricity or an external electric field, and prevent reduction of the manufacturing yield.

Fifth Embodiment

The fifth embodiment will be described. The present embodiment discloses an example of the display device DSP including a sensor which detects a user operation with respect to the display area DA. Unless otherwise specified, the structure and the effect are the same as those of the above-described embodiments.

Figure 12:
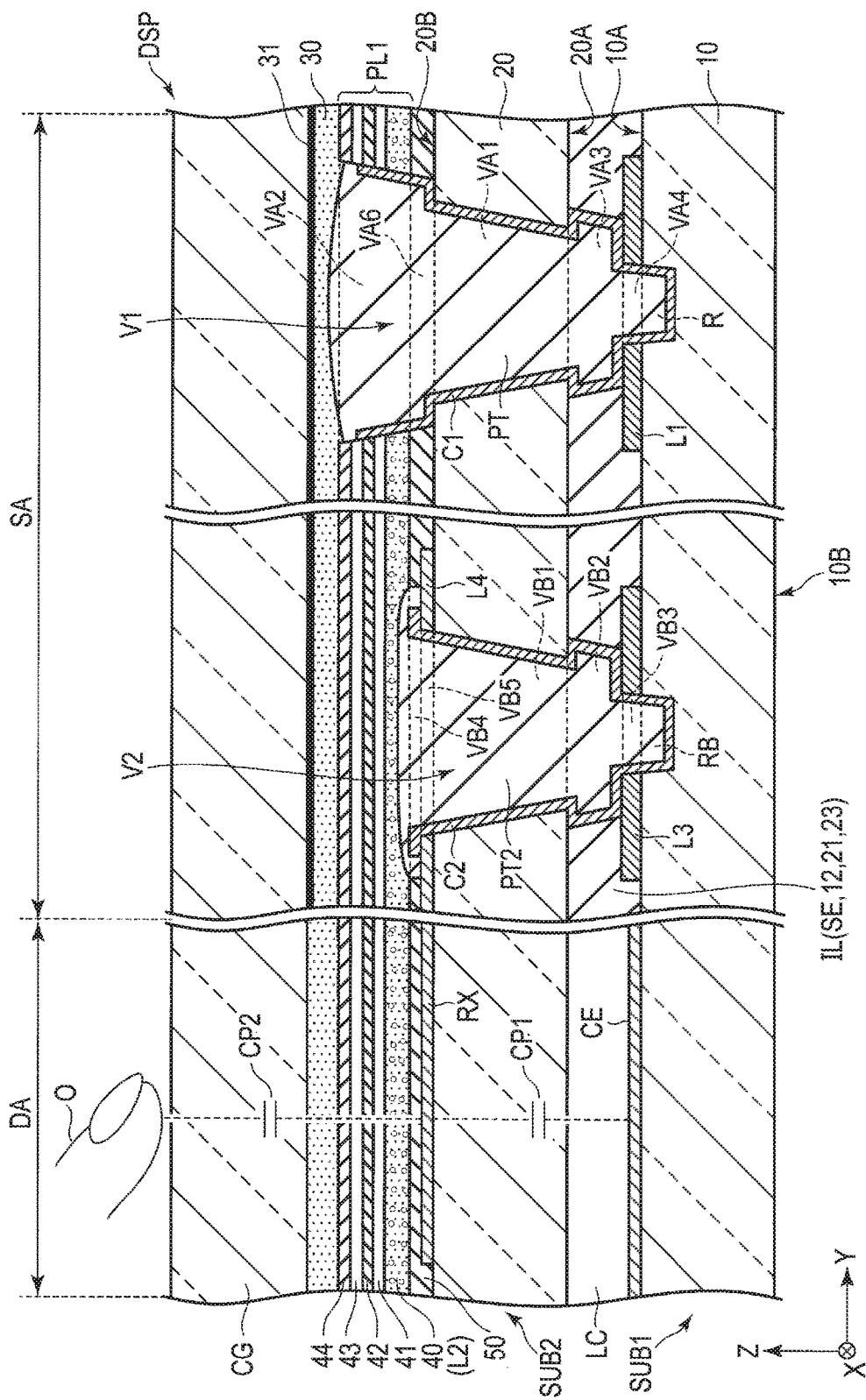
FIG. 12 is a sectional view schematically showing a part of a display device of a fifth embodiment.

FIG. 12 is a schematic sectional view of a part of the display device DSP of the present embodiment. The display device DSP includes a detection electrode RX in the display area DA. For example, the detection electrode RX is formed on the second surface 20B. Note that an insulating layer may be interposed between the detection electrode RX and the second basement 20. The detection electrode RX may be formed of a metal-containing conductive layer or may also be formed of a transparent conductive material such as ITO or IZO. The detection electrode RX is covered with an insulating overcoat layer 50. The detection electrode RX is, for example, a sensor which detects an operation with respect to the display area DA together with the common electrode CE.

The first polarizer PL1 is attached from above the overcoat layer 50 with the adhesive layer 40. As in the case of the first embodiment, the adhesive layer 40 is conductive and corresponds to the second conductive layer L2. However, as in the case of the second to fourth embodiments, the second conductive layer L2 may also be provided separately from the adhesive layer 40.

The detection electrode RX produces capacitance CP1 together with the common electrode CE. Further, when an object O such as a user's finger contacts or approaches the cover glass CG, capacitance CP2 is produced between the object O and the detection electrode RX. To the common electrode CE, a drive signal for object detection is supplied. At this time, a detection signal which is output from the detection electrode RX via the capacitance CP1 varies depending on the presence or absence of the capacitance CP2 or the amount of the capacitance CP2. Therefore, based on the detection signal, the presence or absence of the object O or the position of the object O in the display area DA can be detected.

The detection method described herein is called, for example, a mutual-capacitive method. The detection method of the sensor is not limited to the mutual-capacitive method but may be a self-capacitive method. In the self-capacitive method, a drive signal is supplied to the detection electrode RX, a detection signal is read out from the detection electrode RX, and the presence or absence of the object O or the position of the object O in the display area DA is detected based on the detection signal.

In the surrounding area SA, the contact hole V1 and a contact hole V2 are provided. As an example, the contact hole V2 is closer to the display area DA than the contact hole V1. Note that the contact hole V2 may be farther from the display area DA than the contact hole V1 instead. The structure of the contact hole V1 is the same as the structure of the contact hole V1 in the first embodiment, and the contact hole V1 is a hole for electrically connecting the first conductive layer L1 and the second conductive layer L2 (adhesive layer 40). The contact hole V2 is a hole for electrically connecting the third conductive layer L3 provided on the first substrate SUB1 and the fourth conductive layer L4 provided on the second substrate SUB2.

In the example shown in FIG. 12, the third conductive layer L3 is formed on the first surface 10A and is covered with the insulating layer IL. The insulating layer IL includes, for example, as in the case of the example shown in FIG. 3, the sealant SE, the second insulating layer 12, the light-shielding layer 21, and the overcoat layer 23. The structure is not limited to this example, various insulating layers or various conductive layers may be disposed between the third conductive layer L3 and the first basement 10 or between the third conductive layer L3 and the insulating layer IL. The third conductive layer L3 is formed of a metal material such as molybdenum, tungsten, titanium, aluminum, silver, copper, and chromium, an alloy of these metal materials, or a transparent conductive material such as ITO or IZO. The third conductive layer L3 may have a single layer structure or a multilayer structure.

The fourth conductive layer L4 is formed on the same layer with the detection electrode RX, that is, on the second surface 20B. Note that an insulating layer may be interposed between the detection electrode RX and the second basement 20. For example, the material and the structure of the fourth conductive layer L4 are the same as those of the detection electrode RX, and the fourth conductive layer L4 is covered with the overcoat layer 50.

The third conductive layer L3 is connected to a driver for driving a sensor, for example, via the wiring substrate SUB 3 shown in FIG. 1 and the like. This driver may be incorporated in the IC chip 11 or may be provided as a separate IC chip. The fourth conductive layer L4 is electrically connected to the detection electrode RX.

The contact hole V2 includes a hole VB1 which penetrates the second basement 20, a hole VB2 which penetrates the insulating layer IL, a hole VB3 which penetrates the third conductive layer L3, a hole VB4 which penetrates the overcoat layer 50, and a hole VB5 which penetrates the fourth conductive layer L4. In the position of the contact hole V2, the first polarizer PL1 does not have any hole. Further, the first basement 10 has a recess RB which communicates with the holes VB1 to VB5 on the first surface 10A. The holes VB1 to VB5 and the recess RB are located on the same straight line which extends in the third direction Z. In a plan view, each of the holes VB1 to VB5 and the recess RB is, for example, a regular circle but may also be an ellipse or in various other shapes.

In the contact hole V2, a conductive connecting material C2 and an insulating protection material PT2 are disposed. The connecting material C2 continuously covers the inner surfaces of the holes VB1 to VB5 and the recess RB. In the example shown in FIG. 12, the connecting material C2 covers the upper surface of the third conductive layer L3 in the circumference of the hole VB3. Further, the connecting material C2 covers the upper surface of the fourth conductive layer L4 in the circumference of the hole VB5. In this way, the connecting material C2 is in contact with the third conductive layer L3 and the fourth conductive layer L4 and electrically connects the third conductive layer L3 and the fourth conductive layer L4. The inside of the connecting material C2 is filled with the protection material PT2, and the connecting material C2 is entirely covered with the protection material PT2.

Note that several detection electrodes RX are provided in the display area DA, and that the contact hole V2 is provided for each of the detection electrodes RX. Since each contact hole V2 is opposed to the decorative layer 31 of the cover glass CG, and the contact hole V2 will not be seen from the outside.

In this way, the detection electrode RX of the second substrate SUB2 is connected to the third conductive layer L3 of the first substrate SUB1 via the contact hole V2. Therefore, a detection signal from the detection electrode RX can be output to the wiring substrate SUB3 or the like which is connected to the first substrate SUB1 via the fourth conductive layer L4, the connecting material C2, and the third conductive layer L3.

In the case of mounting a wiring substrate on the second substrate SUB2 and outputting a detection signal from the detection electrode RX, a terminal for mounting the wiring substrate and a routing line for connecting the fourth conductive layer L4 and the wiring substrate will be required. According to the structure of the present embodiment, since such a wiring substrate or a routing line will not be required, the size of the second substrate SUB2 can be reduced, and the width of the frame of the display device DSP can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In each embodiment, the contact material is formed on the inner surface of each of the contact holes V1 and V2, and the inside of the connecting material is filled with the protection material. However, the inside of each of the contact holes V1 and V2 may be filled with the connecting material.

In each embodiment, each of the contact holes V1 and V2 has the recess of the first basement 10. However, each of the contact holes V1 and V2 may not have this recess. Further, the contact hole V1 may not have the hole VA4 which penetrates the first conductive layer L1, or the contact hole V2 may not have the hole VB3 which penetrates the third conductive layer L3.

What is claimed is:

1. A display device comprising:
a first substrate which includes a first conductive layer;
a second substrate which includes a basement which has a first surface opposed to the first substrate and a second surface opposite to the first surface;
a display function layer between the first substrate and the second substrate;
a polarizer which is disposed above the second surface of the basement and includes a second conductive layer; and
a connecting material which electrically connects the first conductive layer and the second conductive layer to each other, wherein
the basement has a first hole,
the polarizer has a second hole which communicates with the first hole, and
the connecting material is in contact with the first conductive layer and the second conductive layer via the first hole and the second hole.

2. The display device of claim 1, further comprising an insulating layer between the first conductive layer and the basement, wherein
the insulating layer has a third hole which communicates with the first hole and the second hole, and
the connecting material is in contact with the first conductive layer and the second conductive layer via the third hole.

3. The display device of claim 2, wherein the insulating layer includes a sealant which attaches the first substrate and the second substrate to each other.

4. The display device of claim 2, wherein
the first conductive layer has a fourth hole which communicates with the third hole, and a first area which is exposed from the insulating layer in a circumference of the third hole, and
the connecting material is in contact with an inner surface of the fourth hole and with the first area.

5. The display device of claim 1, wherein
the second surface of the basement includes a second area which is exposed from the polarizer in a circumference of the first hole, and
the connecting material is in contact with an inner surface of the first hole and with the second area.

6. The display device of claim 1, wherein the second conductive layer is a conductive adhesive layer which attaches the polarizer to the basement and contains a conductive material.

7. The display device of claim 6, wherein the polarizer includes the second conductive layer, a first protection layer, a polarization layer, a second protection layer, and a coat layer in order from a second substrate side.

8. The display device of claim 1, wherein
the polarizer includes the second conductive layer, and a first layer and a second layer between which the second conductive layer is sandwiched,
the second conductive layer includes at least one of a third area which is exposed from the first layer and a fourth area which is exposed from the second layer, in the second hole, and
the connecting material is in contact with at least one of the third area and the fourth area.

9. The display device of claim 1, further comprising a protection material which covers the connecting material and with which the first hole and the second hole are filled.

10. The display device of claim 9, further comprising:
a cover member opposed to the polarizer; and
an adhesive layer which attaches the cover member and the polarizer to each other, wherein
the protection material is covered with the adhesive layer.

11. The display device of claim 10, wherein
the first hole and the second hole are provided in a surrounding area which surrounds a display area where an image is displayed, and
the cover member includes a light-shielding layer opposed to the surrounding area.

12. A display device comprising:
a first substrate which includes a first conductive layer;
a second substrate which includes a basement which has a first surface opposed to the first substrate and a second surface opposite to the first surface;
a display function layer between the first substrate and the second substrate;
a second conductive layer which is disposed above the second surface of the basement and is opposed to a display area where an image is displayed;
a polarizer which includes the second conductive layer; and
a connecting material which electrically connects the first conductive layer and the second conductive layer to each other, wherein
the basement has a first hole,
the polarizer has a second hole which communicates with the first hole,
the connecting material is in contact with the first conductive layer and the second conductive layer via the first hole and the second hole, and
the first conductive layer is grounded.

13. The display device of claim 12, wherein the first conductive layer surrounds the display area.

14. The display device of claim 12, further comprising a wiring substrate mounted on the first substrate, wherein
the first conductive layer is electrically connected to the wiring substrate.

15. The display device of claim 12, further comprising an insulating layer between the first conductive layer and the basement, wherein
the insulating layer has a third hole which communicates with the first hole, and
the connecting material is in contact with the first conductive layer and the second conductive layer via the third hole.

16. The display device of claim 15, wherein
the insulating layer includes a sealant which attaches the first substrate and the second substrate to each other.

17. The display device of claim 12, further comprising a protection material which covers the connecting material and with which the first hole and the second hole are filled.

18. The display device of claim 17, further comprising:
a cover member opposed to the polarizer; and
an adhesive layer which attaches the cover member and the polarizer to each other, wherein
the protection material is covered with the adhesive layer.

19. The display device of claim 18, wherein
the first hole and the second hole are provided in a surrounding area which surrounds the display area, and
the cover member includes a light-shielding layer opposed to the surrounding area.

* * * * *